No. 774,356. PATENTED NOV. 8, 1904.
J. H. HIRT.
DUMPING GRASS COLLECTOR.
APPLICATION FILED JULY 21, 1904.
NO MODEL. 2 SHEETS—SHEET 1.
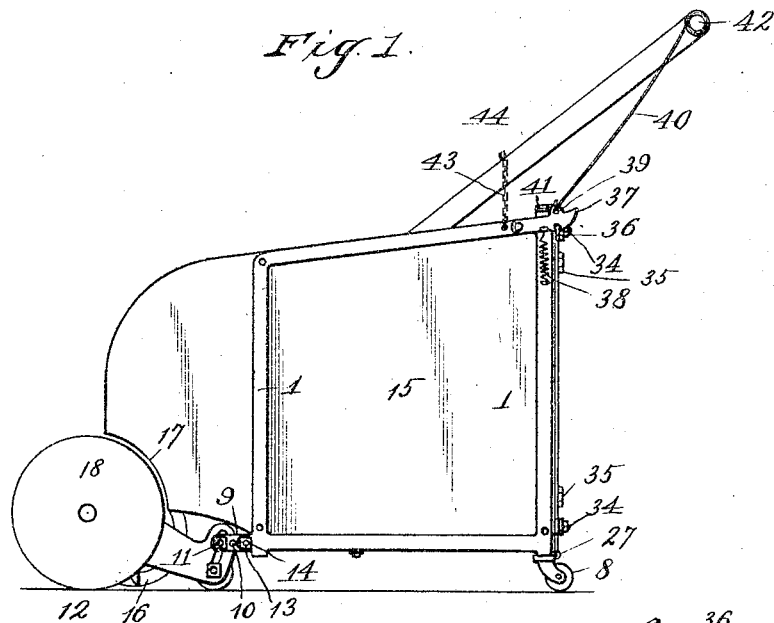
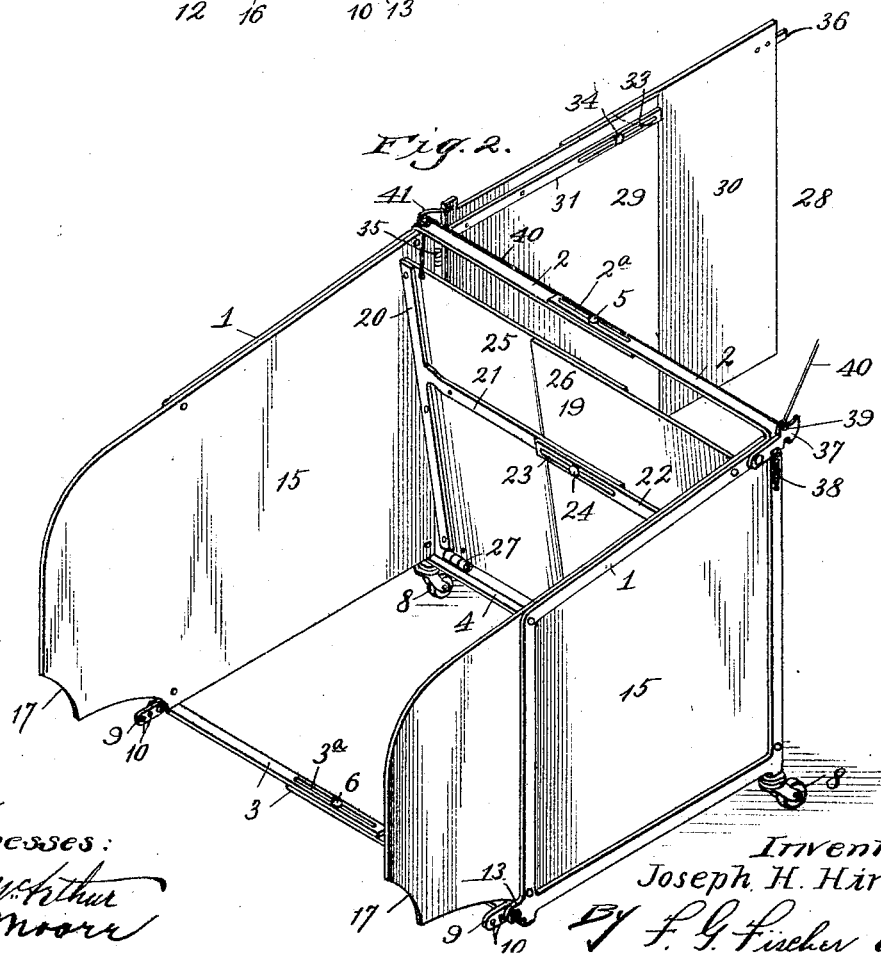

No. 774,356. PATENTED NOV. 8, 1904.
J. H. HIRT.
DUMPING GRASS COLLECTOR.
APPLICATION FILED JULY 21, 1904.
NO MODEL. 2 SHEETS—SHEET 2.

Witnesses:

Inventor
Joseph H. Hirt
by F. G. Fischer
atty.

No. 774,356. Patented November 8, 1904.

UNITED STATES PATENT OFFICE.

JOSEPH H. HIRT, OF BUCYRUS, KANSAS.

DUMPING GRASS-COLLECTOR.

SPECIFICATION forming part of Letters Patent No. 774,356, dated November 8, 1904.

Application filed July 21, 1904. Serial No. 217,464. (No model.)

*To all whom it may concern:*

Be it known that I, JOSEPH H. HIRT, a citizen of the United States, residing at Bucyrus, in the county of Miami and State of Kansas, have invented certain new and useful Improvements in Dumping Grass-Collectors, of which the following is a specification.

My invention relates to improvements in grass-collectors for attachment to lawn-mowers; and the essential features of the collector reside in its hinged bottom and back portions, whereby the grass may be dumped without inverting the collector and the mowing-machine, and in the adjustability of the collector whereby it may be expanded or contracted laterally to fit lawn-mowers of different widths.

The invention further consists in the novel construction, arrangement, and combination of parts hereinafter described, and pointed out in the claims.

In order that the invention may be fully understood, reference will now be made to the accompanying drawings, in which—

Figure 3:
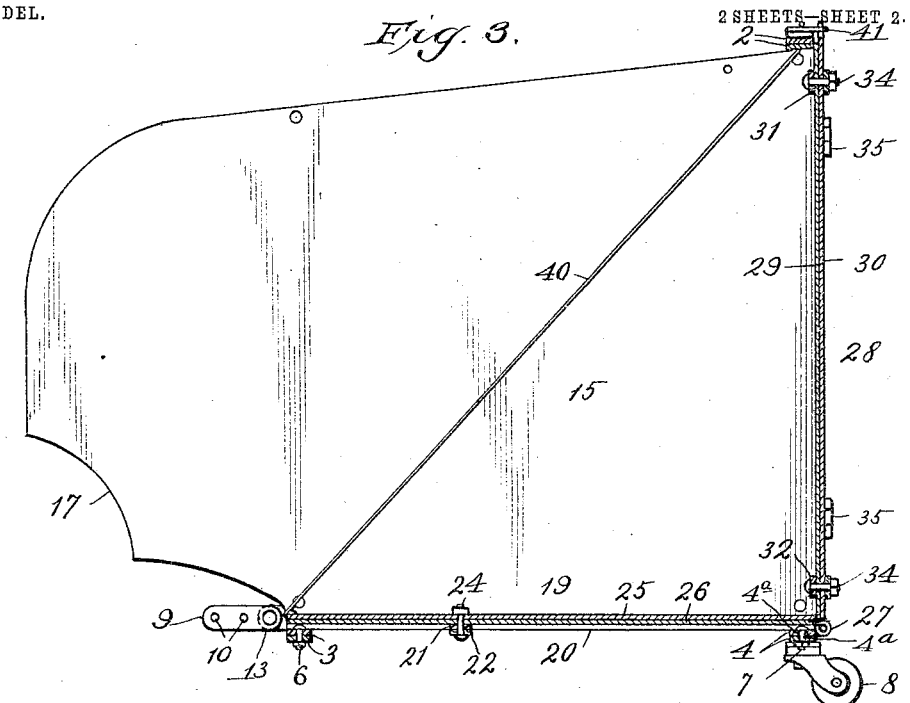
Figure 4:
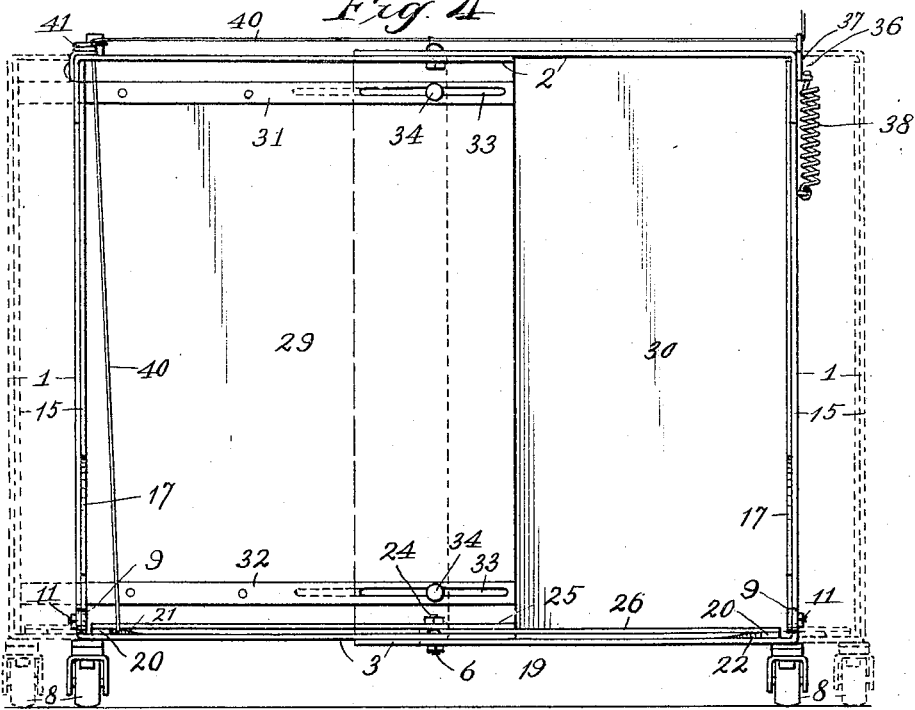

Figure 1 represents a side elevation of my improved grass-collector in position on a lawn-mower. Fig. 2 is an enlarged perspective view of the collector with its bottom and rear walls in the positions they occupy when discharging the grass. Fig. 3 is a vertical sectional view of the collector. Fig. 4 is a front elevation of the same partly contracted in full lines and expanded in dotted lines.

In carrying out the invention I employ a pair of vertically-arranged side frames 1, connected at their upper rear corners and lower front and rear corners by inwardly-extending bars 2, 3, and 4, respectively, the inner ends of which overlap and have slots $2^a$, $3^a$, and $4^a$ in order that they may be expanded or contracted by loosening bolts 5, 6, and 7. The rear ends of frames 1 are mounted upon caster-wheels 8, and their front lower portions are provided with forwardly-extending arms 9, having a series of bolt-holes 10 for the reception of bolts 11, which adjustably secure the forward portions of said arms to the rear slotted ends of the lawn-mower 12. Arms 9 are pivotally secured to the frames by bolts 13 in order that the forward portions of said frames may be adjusted the proper distance from the ground and when thus adjusted are held by clamping-nuts 14, engaging the outer ends of bolts 13.

15 designates sheet-metal side walls riveted to the inner sides of the frames and which extend forwardly beyond the latter in order to guide the grass into the collector when thrown rearwardly by the rotary knife 16 of the lawn-mower. The lower front corners of said side walls are cut out at 17 to fit the curvature of wheels 18.

19 designates a bottom portion comprising a pair of side bars 20, adjustably connected together by inwardly-extending bars 21 22, having slots 23 in their overlapping ends for the reception of a bolt 24, which adjustably secures said bars together, and sheet-metal portions 25 26, riveted to bars 20, 21, and 22 and having slotted overlapping inner ends, so said bottom portion 19 may be expanded and contracted with the side walls of the collector. Bottom portion 19 is secured by hinges 27 to bars 4, and its front end normally rests upon bars 3.

The rear end of the collector is normally closed by a gate 28, comprising two sheet-metal sections 29 30, having slotted overlapping inner ends, and bars 31 and 32, to which section 29 is riveted. Said bars are provided at their inner ends with slots 33 for the adjustment of bolts 34, extending therethrough and secured to section 30 in order that said section may be adjusted on section 29 to accommodate the varying widths to which the side walls and bottom portion 19 may be adjusted.

Gate 28 is secured at one end to one of the side walls by hinges 35 and provided at its opposite end with a bar 36 for engagement with latch 37, pivotally secured to the adjacent frame 1 and which is normally held in engagement with bar 36 by a retractile spring 38. Latch 37 has an eye 39 in its upper forward portion for the reception of a cable 40, which extends therethrough, thence over and through the coils of a spring 41, through bar 2, and is attached at its lower end to the forward end of bottom portion 19. The upper end of said cable is preferably attached to handle 42 of the lawn-mower in order to be within convenient reach of the operator.

Spring 41 is secured at its opposite ends to bar 2 and the hinged end of the gate, so that the instant latch 37 is raised out of engagement from bar 36 gate 28 will be drawn open by said spring in advance of the upward movement of bottom portion 19, so that the grass discharged from the latter will not be impeded by said gate.

43 designates a chain attached at its opposite ends to frames 1 and adapted to engage a hook 44 on the handle-bar of the lawn-mower so that when turning the latter caster-wheels 8 may be raised from the ground, if desired, by elevating handle 42.

In practice the front edge of bottom 19 is arranged the desired height above the ground and the proper distance to the rear of the lawn-mower by properly adjusting arms 9 through the medium of bolt-holes 10 and bolts 11 and 13. Then as the lawn-mower is pushed forward the rotary cutter 16 will cut and throw the severed grass into the collector until the latter is filled. Said collector is then emptied by pulling upwardly on cable 40, which disengages the latch from the gate so the latter will be swung open by spring 41 to permit the grass to discharge from the upwardly-swinging bottom 19, which latter is raised by the operator continuing to pull on the cable. By thus controlling the discharge of the grass the latter may be dumped in piles or in the form of a windrow, so that it can be easily gathered from the lawn.

Having thus described my invention, what I claim, and desire to secure by Letters Patent, is—

1. A grass-collector having two side walls, inwardly-extending bars secured to the side walls and adjustably secured together at their inner overlapping ends, a laterally-adjustable bottom secured to a number of the inwardly-extending bars, and a laterally-adjustable back suitably secured to one of the side walls.

2. A grass-collector having two laterally-adjustable side walls, a bottom portion composed of two sections suitably secured to the side walls at their outer ends and adjustably secured together at their inner overlapping ends, and a gate hinged at one end to one of the side walls composed of two sections the inner overlapping ends of which are adjustably secured together.

3. A grass-collector having two laterally-adjustable side walls, a bottom portion composed of two sections suitably secured to the side walls at their outer ends and adjustably secured together at their inner overlapping ends, a gate hinged at one end to one of the side walls composed of two sections the inner overlapping ends of which are adjustably secured together, and means for normally holding said gate in a closed position.

4. A grass-collector having two laterally-adjustable side walls, a bottom portion composed of two sections suitably secured to the side walls at their outer ends and adjustably secured together at their inner overlapping ends, a gate hinged at one end to one of the side walls composed of two sections the inner overlapping ends of which are adjustably secured together, a latch for normally holding the gate closed, and means for automatically opening the gate when released from the latch.

5. A grass-collector having two side walls, a bottom portion hinged at its rear end to the side walls, a gate hinged to one of the side walls, a latch for normally holding the gate closed provided with an eye, means for automatically opening the gate when released from the latch, and a cable extending through the eye of the latch and attached at its lower end to the front portion of the hinged bottom.

In testimony whereof I affix my signature in the presence of two witnesses.

JOSEPH H. HIRT.

Witnesses:
PAUL LASKIE,
N. H. LINDEMOOD